(12) United States Patent
O'Brien et al.

(10) Patent No.: US 7,824,756 B2
(45) Date of Patent: Nov. 2, 2010

(54) ORIENTED POLYMER COMPOSITION WITH A DEORIENTED SURFACE LAYER

(75) Inventors: James J. O'Brien, Midland, MI (US);
Timothy O. Kirch, Midland, MI (US);
Kevin L. Nichols, Freeland, MI (US);
Brett M. Birchmeier, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 112 days.

(21) Appl. No.: 12/326,129

(22) Filed: Dec. 2, 2008

(65) Prior Publication Data

US 2009/0155534 A1 Jun. 18, 2009

Related U.S. Application Data

(60) Provisional application No. 61/014,131, filed on Dec. 17, 2007.

(51) Int. Cl.
*B32B 3/00* (2006.01)
*B32B 3/12* (2006.01)
*B32B 3/26* (2006.01)
*B32B 5/14* (2006.01)

(52) U.S. Cl. ............... 428/156; 428/158; 428/170; 428/172; 428/304.4

(58) Field of Classification Search .......... 428/156, 428/158, 170, 172, 304.4
See application file for complete search history.

(56) References Cited

U.S. PATENT DOCUMENTS

| | | | |
|---|---|---|---|
| 5,204,045 A | 4/1993 | Courval et al. | |
| 5,474,722 A | 12/1995 | Woodhams | |
| 2004/0068848 A1 | 4/2004 | Ausen et al. | |
| 2008/0111277 A1 | 5/2008 | Nichols et al. | |
| 2008/0111278 A1 | 5/2008 | Nichols et al. | |
| 2009/0001625 A1 | 1/2009 | Newson et al. | |
| 2009/0001629 A1 | 1/2009 | Newson et al. | |
| 2009/0001635 A1 | 1/2009 | Newson et al. | |

FOREIGN PATENT DOCUMENTS

| EP | 1356916 | 10/2003 |
|---|---|---|
| GB | 1311885 | 3/1973 |
| WO | 2008057167 | 5/2008 |
| WO | WO2008/118643 | 10/2008 |

OTHER PUBLICATIONS

U.S. Appl. No. 12/327,122, Bruce A. Malone, et al., filed Dec. 3, 2008, not published yet.
PCT/US2008/085210 WO/ISA Search Report and Written Opinion, Jan. 2010.
PCT/US2008/085210 Claims, Jan. 2010.

*Primary Examiner*—David R Sample
*Assistant Examiner*—Catherine Simone
(74) *Attorney, Agent, or Firm*—Robert L. Stearns; Dickinson Wright, PLLC

(57) ABSTRACT

Prepare an oriented polymer composition that is cavitated, has cross sectional dimensions all at least three millimeters and at least one de-oriented surface layer having a thickness of at least 80 microns and at least 50 microns less than half the thickness of the oriented polymer composition, the de-oriented surface layer having a lower degree of polymer orientation than a 100 micron thick portion of the oriented polymer composition adjacent to and below the de-oriented surface layer by sufficiently heat treating a surface of a cavitated oriented polymer composition.

10 Claims, 8 Drawing Sheets

ORIENTED POLYMER COMPOSITION WITH A DEORIENTED SURFACE LAYER

CROSS REFERENCE STATEMENT

This application claims the benefit of U.S. Provisional Application No. 61/014131 filed Dec. 17, 2007.

BACKGROUND OF THE INVENTION

1. Field of the Invention

The present invention relates to an oriented polymer composition and a process for preparing the oriented polymer composition.

2. Description of Related Art

Oriented polymer compositions (OPCs) are gaining market share in construction markets previously occupied almost solely by wood materials. For example, a number of different OPC decking materials are now available for use instead of cedar, redwood, treated pine, or other more historically standard decking materials.

OPCs are particularly desirable for construction applications. Orienting a polymer composition strengthens the polymer composition by aligning polymer chains in a particular direction. As a result, the flexural modulus of the polymer composition increases, which is desirable in load bearing applications common in construction.

Tensile drawing processes for preparing OPCs can also advantageously induce cavitation during orientation. Cavitation is desirable to reduce OPC density to facilitate shipping and handling of the OPC as well as overall structure weight for structures containing the OPC.

While these attractive features tend to make OPCs more desirable than non-oriented polymer composition, OPCs also have their drawbacks over non-oriented polymer compositions. OPCs can suffer from fibrillation along their orientation direction as groups of aligned polymer chains peel away from neighboring aligned polymers. Fibrillation can be apparent upon scuffing or cutting OPCs transverse to their orientation direction. Therefore, OPCs are desirable for their high flexural modulus, but can have durability problems in regards to fibrillation.

U.S. Pat. No. 5,204,045 ('045) addresses the problem of fibrillation in OPCs by creating an OPC that has a skin of low orientation and a core of higher orientation. The low orientation skin provides integrity lacking in OPCs while the highly oriented core provides a desirable flexural modulus. '045 describes preparing OPCs using a ram extrusion method wherein an orientable polymer composition is pushed through a converging die while maintaining the die at a temperature high enough to melt a polymer skin on the surface of the polymer composition. The resulting OPC has an oriented core and a non-oriented skin directly upon orientation. Ram extrusion methods require application of compressive force rather than tensile force and so cavitation in order to reduce OPC density is not possible. Still more, ram extrusion processes are batch processes as opposed to continuous processes.

It is desirable to find an alternative way to prepare unique OPCs that offers a combination of the high flexural modulus of an OPC with the structural integrity against surface fibrillation of a non-oriented polymer composition and that desirable utilize tensile force, achieves cavitation, is continuous, or any combination of these desirable features. It is also desirable to be able to convert an OPC that has an oriented surface to one that has an oriented core but a de-oriented surface. It can be further desirable to have the option of de-orienting a surface of an OPC while leaving other surfaces oriented in order to, for example, maximize OPC strength by retaining as much orientation as possible while improving cutability on a particular surface.

BRIEF SUMMARY OF THE INVENTION

The present invention offers a method for preparing or modifying a cavitated OPC and surprisingly obtaining an OPC having a de-oriented surface layer and an oriented core that can be a continuous process. Unlike the method of U.S. Pat. No. 5,204,045, the present method offers flexibility of allowing a longitudinal surface of a cavitated OPC to have a de-oriented surface layer while leaving another longitudinal surface highly oriented. The present process is further distinguished from the process of U.S. Pat. No. 5,204,045 because orientation can occur apart from a die heated to a temperature high enough to melt the polymer composition being oriented and, hence, the present process can achieve a greater extent of orientation and can experience cavitation. As a result, the present method advances the art over known ram-extrusion methods and even over known tensile drawn methods. The resulting OPC surprisingly enjoys high flexural modulus of an OPC and high structural integrity against fibrillation of a non-oriented polymer composition as well as a reduced density due to cavitation.

The present invention also offers a robust process for producing a cavitated OPC having excellent cutability transverse to the orientation axis of the OPC. A surprising discovery behind the present invention is that cutability (that is, the quality of a cut) transverse to the orientation axis of an OPC can be improved by de-orienting a longitudinal surface layer and that most of the improvement in cutability occurs as the de-oriented longitudinal surface layer approaches about 80 microns in thickness. De-oriented longitudinal surface layers having a thickness greater than 80 microns still tend to improve cutability, but to a lesser extent than increasing the thickness of a de-oriented longitudinal surface layer up to about 80 microns. Hence, introducing a de-oriented longitudinal surface layer with a thickness of less than 80 microns results in poor cutability and a large variability in cutability. In contrast, introducing a de-oriented longitudinal surface layer with a thickness greater than 80 microns results in excellent cutability and low variability in cutability.

Still another unexpected surprising result of the process and OPC of the present invention is that heating a cavitated OPC containing a pigment results in darkening the appearance of the OPC. That is, an OPC containing a pigment appears darker after heating and creating a de-oriented surface layer. Such an unexpected darkening is desirable because it stabilized an OPC from later darkening in color if exposed to high temperatures. Another desirable feature of the darkening is that less pigment is required to obtain the same degree of color for an OPC containing a de-oriented surface layer as compared to an OPC that does not contain a de-oriented surface layer.

In a first aspect, the present invention is an oriented polymer composition comprising a continuous orientable polymer phase wherein the oriented polymer composition: (a) is cavitated; (b) is of sufficient size that each cross sectional dimension of the oriented polymer composition is at least three millimeters; and (c) has a thickness, at least one surface and at least one de-oriented surface layer that contains the surface, the de-oriented surface layer having a thickness of at least 80 microns and at least 50 microns less than half of the thickness of the oriented polymer composition, the de-oriented surface layer characterized by having a lower degree of polymer orientation than a 100 micron thick portion of the oriented polymer composition adjacent to the de-oriented layer and more proximate to the center of the oriented polymer composition.

Embodiments of the first aspect include one or any combination of more than one of the following features: the OPC contains at least one filler material, desirably an inorganic filler material; the OPC comprises at least one pigment; the OPC has a density of 0.9 grams per cubic centimeter or less; at least one surface that is part of a de-oriented surface layer that is further characterized by having an embossed pattern; the polymers in the de-oriented surface layer have an orientation ratio value of 2 or less while the oriented polymer composition below the de-oriented surface layer and extending to a depth of 100 microns below the de-oriented surface layer has an average orientation ratio value of greater than 2 with orientation ratio determined according to the Orientation Ratio Measurement Method described herein; oriented polymer composition has a flexural modulus of 2.8 gigapascals or greater according to ASTM method D6109; and the continuous orientable polymer phase comprises at least one polymer selected from a group consisting of polypropylene, polyethylene, polyester and polyvinylchloride.

In a second aspect, the present invention is a process for preparing an oriented polymer composition having a softening temperature and a de-oriented surface layer, both the oriented polymer composition and de-oriented surface layer having a thickness, the process comprising: (a) providing a cavitated oriented polymer composition comprising a continuous oriented polymer phase and having at least one surface comprising oriented polymers and having cross sectional dimension all exceeding three millimeters; and (b) heating at least one surface of the oriented polymer composition above its softening temperature thereby de-orienting the polymers proximate to the surface to create a de-oriented surface layer that has a thickness of 80 microns or more and at least 50 microns less than half the thickness of the oriented polymer composition.

Embodiments of the second aspect include one or any combination of more than one of the following features: step (a) comprises: (i) providing a polymer composition having a continuous orientable polymer phase and a softening temperature at a drawing temperature that is 0-50° C. below the softening temperature; and (ii) tensile drawing the polymer composition to produce an oriented polymer composition having at least one surface and cross sectional dimensions of three millimeters or more; step (ii) includes drawing the polymer composition through a solid state drawing die that is at or below the softening temperature of the polymer composition; the polymer composition continues to draw down in a free-draw manner after exiting the solid state drawing die; the oriented polymer composition contains at least one type of filler, desirably an inorganic filler; the oriented polymer composition contains at least one pigment; the heating is sufficient to create a de-oriented surface layer whose polymers have an orientation ratio value of 2 or less while the oriented polymer composition below the de-oriented surface layer and extending to a depth of 100 microns below the de-oriented surface layer has an average orientation ratio value of greater than 2 with orientation ratio determined according to Orientation Ratio Measurement Method; further comprising a step of embossing at least one surface of the oriented polymer composition, preferably where the embossing step occurs after creating the de-oriented surface layer in step (b); and wherein the continuous orientable polymer phase comprises at least one polymer selected from a group consisting of polypropylene, polyethylene, polyester and polyvinylchloride polymers.

The process of the present invention is useful for preparing OPCs of the present invention, which are useful as construction materials including decking, siding and trim.

DETAILED DESCRIPTION OF THE INVENTION

Definitions

Figure 1:
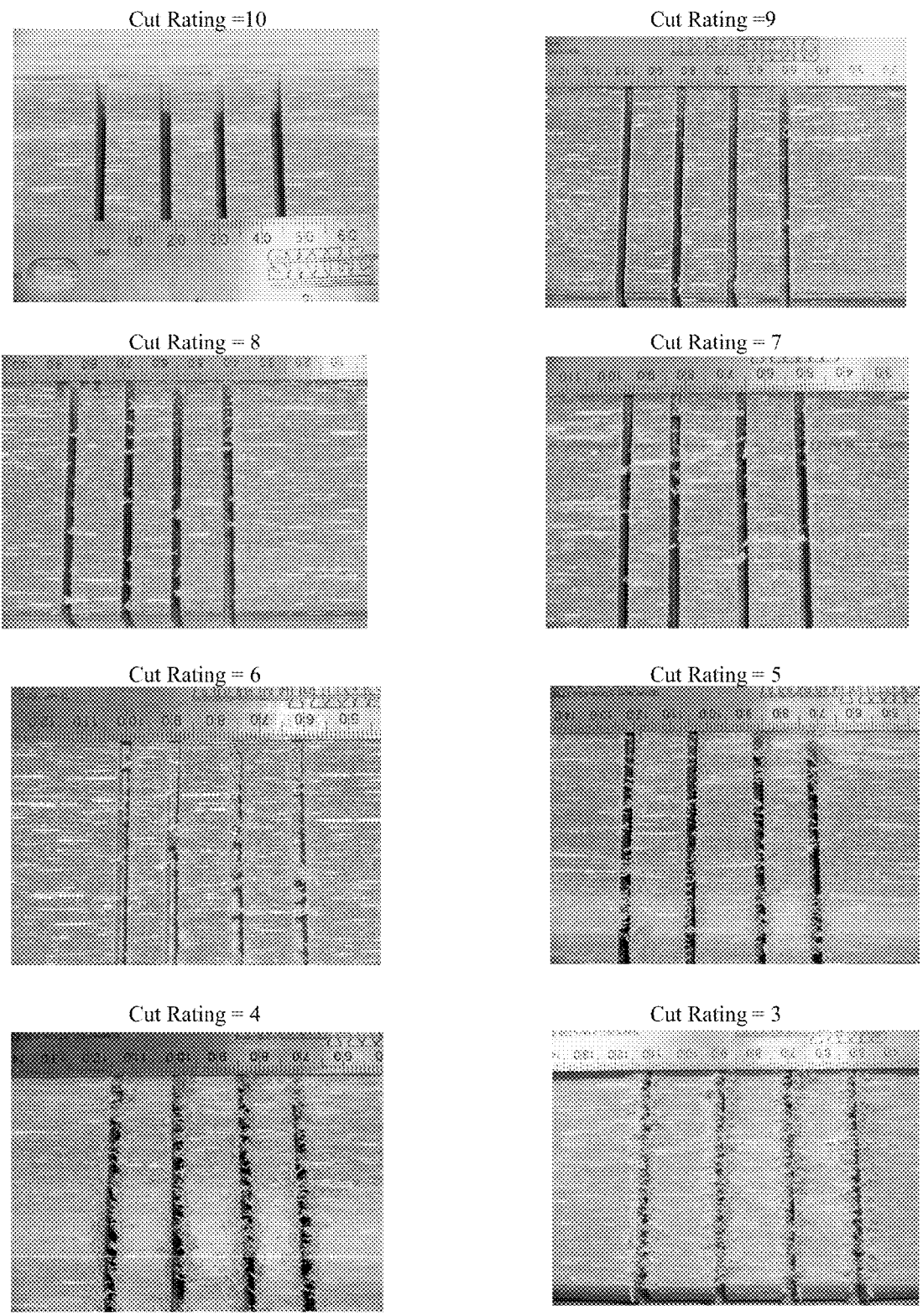
FIG. 1 illustrates photos of cutability level standards.

"Cutability" refers to how cleanly a material can be cut. Determine cutability using the Cutability Test Method set forth in the Test Methods section, below.

"Orientation Ratio", or "OR", is a measure of orientation in the drawing direction relative to orientation in the thickness dimension for an OPC. Drawing direction, thickness dimension and width dimensions are all mutually perpendicular. The orientation ratio is a ratio of molecular orientation parallel to orientation direction relative to orientation perpendicular to orientation direction. Determine OR according to the Orientation Ratio Measurement Method set forth in the Test Methods section, below.

A "cross sectional dimension" is the length of a straight line connecting two points on a cross section's perimeter and extending through the centroid of the cross section. For example, a cross sectional dimension of a rectilinear four-sided polymer composition could be the height or width of the polymer composition.

A "surface" of a polymer composition refers to that portion of the polymer composition that interfaces with the environment surrounding the polymer composition. Generally, a polymer composition is considered to have more than one surface, with each surface distinguished from another surface by an edge. A sphere, for example, has a single surface and is free of edges. A rectangular box, on the other hand, has six surfaces and 12 edges.

A "longitudinal surface" of an oriented polymer composition is a surface that extends parallel to the drawing direction and orientation axis of the oriented polymer composition.

A "surface layer" contains at least part of a surface and extends to some depth into a polymer composition or oriented polymer composition.

A "de-oriented surface layer" is a surface layer that has experienced a reduction in polymer orientation.

An "end surface" of a polymer composition refers to a surface, or portion of surface, through which the orientation axis of the polymer composition extends. An end surface has a vector component perpendicular to the drawing direction of the polymer composition.

"Solid state" refers to a polymer (or polymer composition) that is at a temperature below the softening temperature of the polymer (or polymer composition). Hence, "solid state drawing" refers to drawing a polymer or polymer composition that is at a temperature below the softening temperature of the polymer (or polymer composition).

"Polymer composition" comprises a continuous polymer phase containing at least one polymer component and can contain non-polymeric components.

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. If the combination of polymers or filled polymer composition only contains miscible polymers and only one crystalline-to-melt phase change is evident in its DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the lowest $T_m$ of the continuous phase polymers.

$T_s$ for a polymer or polymer composition having as polymer components only one or more than one amorphous polymer is the glass transition temperature for the polymer composition.

"Glass transition temperature" ($T_g$) for a polymer or polymer composition is as determined by DSC according to the procedure in ASTM method E1356-03. Determine $T_g$ for a combination of polymer and for a filled polymer composition also by DSC under the same test conditions in ASTM method E1356-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the lowest $T_g$ of the continuous phase polymers.

If the polymer composition contains a combination of semi-crystalline and amorphous polymers, the softening temperature of the polymer composition is the softening temperature of the continuous phase polymer or polymer composition. If the semi-crystalline and amorphous polymer phases are co-continuous, then the softening temperature of the combination is the lower softening temperature of the two phases.

"Orientation axis" and "orientation direction", in reference to an OPC, is a line through an OPC that extends in the direction of predominant polymer alignment within the OPC.

"Centroid" refers to a point whose coordinates are the averages of the corresponding coordinates of a given set of points and which for a given plane (for example, a cross section) corresponds to the center of mass of a thin plate of uniform thickness and consistency or a body of uniform consistency having the same boundary.

"Cross sections" herein are perpendicular to the orientation axis unless the reference to the cross section indicates otherwise. A cross section has a centroid and a perimeter that defines a shape for the cross section.

"Drawing temperature" ($T_d$) is a temperature within a drawing temperature range at which a polymer is conditioned prior to drawing and is the temperature at which the polymer exists upon the initiation of drawing.

An artisan understands that a polymer composition typically has a variation in temperature through its cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. Measure the temperature in degrees Celsius (° C.) along a cross sectional dimension by inserting thermocouples to different points along the cross sectional dimension.

A "converging die" is a die having a shaping channel with a converging profile. "Converging profile" refers to a shaping channel that reduces in cross sectional area, preferably in a streamline fashion, over at least a portion of the shaping channel when proceeding from the entrance opening of the shaping channel to the exit opening of the shaping channel. In other words, a shaping channel has a converging profile if at least one cross section of the shaping channel has a cross sectional area greater than a cross section for the shaping channel more proximate to the exit opening of the shaping channel. Preferably, any cross section of the shaping channel in a converging die has a cross sectional area that is equal to or greater than the cross sectional area of any other cross section of the shaping channel more proximate to the exit opening of the shaping channel.

"Foaming agent residuals" are remnants of materials introduced into a polymer composition for the purpose of expanding during to create cells within the polymer composition and includes foaming agents as well as decomposition products of chemical foaming agents.

"ASTM" refers to an American Society for Testing and Materials test method. The year of the method is either designated by a hyphenated suffix in the method number or, in the absence of such a designation, is the most current year prior to the filing date of this application.

"Multiple" means at least two.

Process and OPC of the Present Invention

In its broadest scope, the process of the present invention comprises two steps: (a) providing a cavitated oriented polymer composition (OPC); and (b) heating at least one longitudinal surface of the OPC sufficiently to de-orient the polymer proximate to the surface to create a de-oriented surface layer.

It is suitable to prepare the cavitated OPC for use in the present invention by solid state tensile drawing an orientable polymer composition. A solid state extrusion process (such as a ram extrusion process), which utilizes compressive force rather than tensile force to orient a polymer composition, is not suitable for preparing the cavitated OPC for use in the present invention since cavitation requires a solid state tensile drawing process.

Suitable solid state tensile drawing processes include free draw processes, die drawing processes, roller drawing (drawing through moving rollers) or any combination of any of these. Free drawing occurs by applying a tensile force to a solid state orientable polymer composition sufficient to cause the orientable polymer composition to elongate and orient in a drawing direction free of physical constraints directing how the cross section necks (narrows in cross sectional area) during elongation. Solid state die drawing occurs by applying a tensile force to pull a solid state orientable polymer composition through a converging die that directs necking of the polymer composition as the polymer composition elongates and orients. An orientable polymer composition in a solid state die drawing process can continue to free draw after exiting a solid state drawing die and thereby experience a combination of die drawing and free drawing. It is most desirable to use a solid state die drawing die in order to precisely control the final cross sectional shape of the resulting OPC. Even if some free drawing occurs after the solid state drawing die, the die generally will direct the free drawing and offer better control over final OPC dimensions than a free draw process that does not use a solid state drawing die.

Tensile draw an orientable polymer composition when the orientable polymer composition is at a drawing temperature ($T_d$) in a temperature range of 0-50° C. below the orientable polymer composition's $T_s$. Preferably, $T_d$ for an orientable polymer composition is 25° C. or less, more preferably 15° C. or less below the orientable polymer composition's $T_s$ and can be 1° C. or more, even 5° C. or more below the orientable polymer composition's $T_s$. When using a solid state drawing die it is desirable to maintain the die at a temperature at or below $T_s$ of the orientable polymer composition being drawn. Using a die that is at a temperature above $T_s$ of the orientable polymer composition being drawn inhibits the ability to orient the orientable polymer composition and to achieve cavitation by lubricating flow through the die with a film of softened polymer composition. As a result, the resulting OPC does not achieve optimal orientation (which means it lacks optimal flexural modulus) and does not achieve optimal cavitation (which means it does not achieve minimal density).

One advantage of the present process is that only a single longitudinal surface or select longitudinal surfaces of the cavitated OPC need be de-oriented, allowing an option to leave other longitudinal surfaces oriented. Hence, the OPC of the present invention may comprise a longitudinal surface that is highly oriented and another longitudinal surface that has been de-oriented and is part of a de-oriented surface layer.

The orientable polymer composition, the cavitated OPC, as well as an OPC of the present invention, each has a continuous orientable polymer phase. Typically, 75 weight-percent (wt %) or more, even 90 wt % or more or 95 wt % or more of the polymers in the orientable polymer composition, the cavitated OPC and the OPC of the present invention are orientable polymers based on total polymer weight. All of the polymers in an orientable polymer composition, cavitated OPC and OPC of the present invention can be orientable polymers.

An orientable polymer is a polymer that can undergo induced molecular orientation by solid state deformation (for example, solid state drawing). An orientable polymer can be amorphous or semi-crystalline (semi-crystalline polymers have a melt temperature ($T_m$) and include those polymers known as "crystalline"). Desirable orientable polymers include semi-crystalline polymers, even more desirable are linear polymers (polymers in which chain branching occurs in less than 1 of 1,000 polymer units). Semi-crystalline polymers are particularly desirable because they result in greater increase in strength and modulus than amorphous polymer compositions. Semi-crystalline polymer compositions can result in 4-10 times greater increase in strength and flexural modulus upon orientation over amorphous polymer compositions.

Suitable orientable polymers include polymers and copolymers of polystyrene, polycarbonate, polypropylene, polyethylene (including high density polyethylene), polymethylpentane, polytetrafluoroethylene, polyamides, polyesters such as polyethylene terephthalate and polybutylene terephthalate, polycarbonates, polyethylene oxide, polyoxymethylene and blends thereof. Particularly desirably orientable polymers include polyethylene, polypropylene, and polyesters. More particularly desirable orientable polymers include linear polyethylene having a weight-average molecular weight from 50,000 to 3,000,000; especially from 100,000 to 1,500,000, even from 750,000 to 1,500,000. Polyvinylidene fluoride polymers having a weight-average molecular weight of from 200,000 to 800,000, preferably 250,000 to 400,000 are also suitable.

Polypropylene (PP)-based polymers are especially desirable for use in the present invention. PP-based polymers generally have a lower density than other orientable polymers. Therefore, PP-based polymers facilitate lighter articles than other orientable polymers. Additionally, PP-based polymers offer greater thermal stability than other orientable olefin polymers. Therefore, PP-based polymers may also form oriented articles having higher thermal stability than oriented articles of other polymers.

Suitable PP-based polymers include Zeigler Natta, metallocene and post-metallocene polypropylenes. Suitable PP-based polymers include PP homopolymer; PP random copolymer (with ethylene or other alpha-olefin present from 0.1 to 15 percent by weight of monomers); PP impact copolymers with either PP homopolymer or PP random copolymer matrix of 50-97 percent by weight (wt %) based on impact copolymer weight and with ethylene propylene copolymer rubber present at 3-50 wt % based on impact copolymer weight prepared in-reactor or an impact modifier or random copolymer rubber prepared by copolymerization of two or more alpha olefins prepared in-reactor; PP impact copolymer with either a PP homopolymer or PP random copolymer matrix for 50-97 wt % of the impact copolymer weight and with ethylene-propylene copolymer rubber present at 3-50 wt % of the impact copolymer weight added via compounding, or other rubber (impact modifier) prepared by copolymerization of two or more alpha olefins(such as ethylene-octene)by Zeigler-Natta, metallocene, or single-site catalysis, added via compounding such as but not limited to a twin screw extrusion process.

The PP-based polymer can be ultra-violet (UV) stabilized, and desirably can also be impact modified. Particularly desirable PP-based polymers are stabilized with organic stabilizers. The PP-based polymer can be free of titanium dioxide pigment to achieve UV stabilization thereby allowing use of less pigment to achieve any of a full spectrum of colors. A combination of low molecular weight and high molecular weight hindered amine-type light stabilizers (HALS) are desirable additives to impart UV stabilization to PP-based polymers. Suitable examples of commercially available stabilizers include IRGASTAB™ FS 811, IRGASTAB™ FS 812 (IRGASTAB is a trademark of Ciba Specialty Chemicals Corporation). A particularly desirable stabilizer system contains a combination of IRGASTAB™ FS 301, TINUVIN™ 123 and CHIMASSORB™ 119. (TINUVIN and CHIMASSORB are trademarks of Ciba Specialty chemicals Corporation).

The cavitated OPC, as well as an OPC of the present invention, may contain fillers including organic, inorganic or a combination of organic and inorganic fillers. It is desirable for the inorganic component to comprise 50 volume percent (vol %) or more, preferably 75 vol % or more, and most preferably 100 vol % of the total volume of filler. Inorganic fillers are more desirable than organic fillers for numerous reasons including that inorganic fillers tend to be more thermally stable and resistant to decay and discoloration due to weathering. The fillers, if present, exist dispersed within the orientable polymer.

Suitable organic fillers include cellulosic materials such as wood flour, wood pulp, flax, rice hulls or any natural fiber. Suitable inorganic filler include mica, talc (including any or a combination of materials and grades commonly known and available as "talc"), chalk, titanium dioxide, clay, alumina, silica, glass beads, calcium carbonate, magnesium sulfate, barium sulfate, calcium oxysulfate, tin oxide, metal powder, glass powder, pigments, minerals, glass, ceramic, polymeric or carbon reinforcing agent fillers such as glass fibers, micas, talcs, carbon fibers, wollastonite, graphite, silica, magnesium carbonate, alumina, metal fibers, kaolin, silicon carbide, glass flake and the like.

Fillers can serve many purposes including serving to enhance flame retardancy, induce cavitation during the drawing process, and provide partial reinforcement of an article. Inorganic fillers are more desirable than organic fillers in the present invention because organic fillers can undergo charring, and associated discoloration, upon heating a surface of the cavitated OPC to form a de-oriented longitudinal surface layer. Organic fillers also have a tendency to cause the color of a final OPC to fade over time.

The cavitated OPC contains microscopic voids dispersed in the OPC and that developed as a result of cavitation. Cavitation can occur when an orientable polymer composition undergoes solid state tensile drawing to induce polymer orientation. Cavitation is unique to tensile drawing processes of solid state orientation; extrusion (compressive) methods of inducing orientation cannot produce cavitation. Voids resulting from cavitation can be free of foaming agent residuals (including foaming agents and chemical foaming agent decomposition products) since foaming agents are unnecessary for forming the voids. Another distinguishing characteristic of cavitated OPC is that cavitated voids extend throughout a cross section of the oriented OPC. In contrast, U.S. Pat. No. 5,474,722 provides a foamed OPC that contains a solid (unexpanded) skin.

Desirably, the cavitated OPC, as well as an OPC of the present invention, has a void volume due to cavitation of at least 30 vol %, preferably 35 vol % or more, more preferably 40 vol % or more.

Additionally, it is desirable that the cavitated OPC, as well as OPCs of the present invention, have a density of 0.9 grams per cubic centimeter (g/cc) or less, preferably 0.85 g/cc or less, more preferably 0.8 g/cc or less. Lower density materials are desirable to produce lower density articles—which are easier to handle and ultimately produce lower weight building structures.

It is desirable for the cavitated OPC, as well as the OPC of the present invention, to have a flexural modulus of 1.4 gigapascals (GPa) (200,000 pounds per square inch (psi)) or greater, preferably 2.1 GPa (300,000 psi) or greater, more preferably 2.8 GPa (400,000 psi) or greater. Measure flexural modulus according to ASTM method D6109.

The cavitated OPCs for use in the present invention, as well as the OPCs of the present invention, are larger in dimension than fiber and film materials. In that regard, the cavitated OPCs for use in the present invention and OPCs of the present invention have cross sectional dimensions that all exceed three millimeters, preferably all exceed five millimeters, and all cross sectional dimensions can exceed 10 millimeters, 20 millimeters, 25 millimeters, even 50 millimeters.

The cavitated OPC and OPC of the present invention can have a circular or, more typically, a non-circular cross section. Concomitantly, the cavitated OPC and OPC of the present invention has at least one longitudinal surface. OPCs having a circular (which herein includes elliptical) cross sections have a single longitudinal surface. OPCs having a triangular cross section have three longitudinal surfaces. OPCs having a square or rectangular cross section have four longitudinal surfaces.

One of the handicaps of OPCs, particularly those prepared in a solid state die drawing process, is their inherent propensity to undergo fibrillation by delaminating fibers along the drawing direction of the OPC. This propensity is particularly evident upon cutting OPCs transverse to the drawing direction. The tendency for an OPC to undergo fibrillation increases with the extent of orientation in the polymer composition. However, increasing orientation also desirably increases the flexural modulus (modulus of elasticity) of the polymer composition and the extent of cavitation. A high flexural modulus is desirable for applications where the OPC will be subject to a load, such as in construction applications including decking. A high level of cavitation is desirable to reduce the overall density of an OPC. As a result, a compromise must be made between maximizing orientation (and thereby flexural modulus and cavitation) while minimizing or avoiding fibrillation. The process of this invention allows for modification of a cavitated OPC so to move that compromise towards achieving higher orientation (and higher flexural modulus and cavitation) without suffering from undesirable fibrillation.

To that end, the process of the present invention includes a step of heating one or more surface of a cavitated OPC above the OPC's $T_g$, thereby de-orienting polymers on and proximate to the surface in order and creating a de-oriented surface layer. This step transforms the cavitated OPC into an OPC of the present invention. The transformation to an OPC of the present invention occurs as polymer molecules that were oriented in and near a longitudinal surface of the cavitated OPC relax their orientation. Necessarily, then, the cavitated OPC initially has an oriented longitudinal surface that undergoes a relaxation to reduce the orientation in and near that surface as a de-oriented surface layer forms.

It is desirable to obtain an OPC that resists fibrillation when cut transverse to its orientation direction—a practical test that is repeatedly necessary when cutting decking boards to length. Thicker de-oriented surface layers, are more resistant to fibrillation. Yet, a surprising discovery is that increasing a de-oriented surface layer thickness up to approximately 80 microns dramatically improves cutability while increasing the de-oriented surface layer thickness beyond approximately 80 microns offers little improvement in cutability.

The heating step is sufficient in time and temperature to create a de-oriented surface layer that is at least approximately 80 microns thick, preferably 100 microns or more, still more preferably 150 microns or more, even more preferably 200 microns or more, yet more preferably 300 microns or more or 400 microns or more. A thickness of at least 80 microns is necessary for the modified surface to achieve a cut rating value of 7 or higher when evaluated according the Cutability Test Method (described in the Test Methods section, below). An OPC having a cut rating of at least 7 is desirable because they have fibrils at most sporadically along a cut surface. The maximum thickness of the de-oriented surface layer is only limited by the thickness of the cavitated OPC. The de-oriented surface layer thickness is at least 50 microns less than half the thickness of the cavitated OPC. Measure thickness perpendicularly to a surface.

An OPC of the present invention desirably has a cutability rating of 7 or higher, preferably 8 or higher, more preferably 9 or higher and most preferably 10 when evaluated according to the Cutability Test Method.

Heat the surface of a cavitated OPC by contacting it with a rigid or non-rigid heating medium. Heating above the $T_s$ of the OPC softens the polymer sufficiently that contacting with a rigid heating medium (such as a heating plate, roller or belt) can displace polymers on the surface and deform the OPC's appearance. Therefore, heating with a non-rigid heating medium is most desirable. Examples of non-rigid heating media include hot air or other gas, electromagnetic radiation (for example, infrared radiation), flames, and hot liquids.

Typical embossing processes, which also can involve heating a surface layer, are insufficient for preparing a de-oriented surface layer. Embossing procedures require impressing a rigid medium onto the surface of a material. Contact time between the rigid medium, which can be heated, and the material surface is minimal in order to avoid undesirable deformation of the material. As Comparative Example C below, illustrates, surface heating during embossing procedures does not heat sufficiently to de-orient polymers to a depth of 80 microns or more. Hence, embossing alone does not create the OPC of the present invention.

It is acceptable to heat a surface of the OPC in order to form a de-oriented surface layer after all drawing of the OPC is complete. It is also acceptable to form an OPC by drawing a polymer composition through a solid state drawing die and then begin applying heat to a surface while the polymer composition is experiencing free drawing after the drawing die. Hence, formation of the de-oriented surface layer can begin before all drawing and orientation in the polymer composition is complete.

The de-oriented surface layer can contain an entire surface or a portion of a surface, but desirably contains at least one entire longitudinal surface of a cavitated OPC. Typically, the de-oriented surface layer includes at least 75%, preferably 90% or more, still more preferably 95% or more and most preferably 100% of a longitudinal surface based on planar surface area (that is, the area of a surface as projected onto a plane).

One way to characterize extent (or degree) of polymer orientation in a portion of an OPC is by determining an orientation ratio (OR) for that portion of the OPC. The general method for determining OR is given in the Test Methods section, below. Basically, OR is a polarized spectroscopic measurement of the orientation of a polymer along a drawing direction relative to orientation along a direction perpendicular to the orientation direction. Highly oriented polymer compositions desirably have an OR value of greater than 2, preferably 2.5 or greater, more preferably 3 or more. Relaxed polymer compositions desirably have an OR value of less than 2, preferably two or less, more preferably 1.5 or less, still more preferably 1.25 or less and most desirably of one.

OPCs of the present invention desirably have de-oriented surface layers having OR values of less than 2, preferably 1.5 or less, more preferably 1.25 or less and most preferably of one. Concomitantly, polymers in a 100 micron thick layer adjacent to and below (more interior) the de-oriented surface layer desirably have an average OR of greater than 2, preferably 2.5 or more, more preferably 3 or more. Prior to heating a surface to create a de-oriented surface layer, polymers within 50 microns of any longitudinal surface of the cavitated OPC generally have an average OR value greater than 2, preferably 2.5 or more, more preferably 3 or more.

One way to determine the thickness of the de-oriented surface layer is from a plot of OR as a function of depth into an OPC along a cross section of the OPC. Plot OR as a function of depth at approximately 20 micron depth intervals. The depth into the OPC at which the OR first reaches 2 corresponds to the depth of the de-oriented surface layer.

After preparing a de-oriented longitudinal surface layer, it is generally desirable to cool the de-oriented surface(s) of the cavitated OPC, preferably to a temperature below $T_s$ of the OPC, before contacting the surface(s) with any rigid materials such as a pulling device or embossing device in order to avoid undesirable deformation of the hot surface(s) of the OPC.

Creating a de-oriented surface layer on an OPC containing pigment tends to darken the appearance of the de-oriented surface layer. This darkening is a surprising result and can be desirable. A de-oriented surface layer only appears to darken to a certain extent with heating. Therefore, creating a de-oriented surface layer on an OPC can darken the surface and thereby stabilize the color appearance of the OPC to significant subsequent darkening with further heat exposure when in use. This is desirable so that, for example, homeowners do not accidentally discolor their decking materials by setting hot cooking utensils on them. Moreover, darkening the appearance of an OPC by introducing a de-oriented surface layer may allow for use of less pigment to achieve a similar degree of color.

The process of the present invention may further include an embossing step where a surface of the cavitated OPC is embossed. If embossing is desired on a surface that is part of a de-oriented surface layer, embossing desirably occurs after the heating step that creates the de-oriented surface layer. That way, features of the embossing will remain sharp whereas embossing and then heating can cause features of the embossing to become less detailed or sharp or defined. Hence, an OPC of the present invention may include an embossed surface, even an embossed surface that is part of a de-oriented surface layer.

The process of the present invention produces an OPC of the present invention, which is unique as a result of the process. The OPC of the present invention desirably has a high flexural modulus (at least 1.4 gigapascals (200,000 psi), with preferred values as previously stated) and high void volume (at least 30 vol %, with preferred values previously stated) while achieving high quality cutability (cut rating of at least 7, with preferred values as previously stated). Moreover, these combinations of properties are possible with an absence of foaming agents or foaming agent residuals in the OPC and with void throughout an entire cross section of the OPC. Such a combination of properties is unknown in the art. The high quality cutability is achieved by creating a de-oriented longitudinal surface layer that is at least about 80 microns thick on one or more longitudinal surface of a cavitated OPC.

Test Methods

Cutability Test Method

Equipment:
12 inch sliding compound miter saw with extension tables.
12 inch diameter titanium coated combination blade with 60 carbide tipped teeth (item number R1260C from Rigid Tool Company or an equivalent blade).

Test Procedure:
Equilibrate the test samples for 24 hours to 23° C. (+/−5° C.). For the most accurate results, samples should be of a size that the blade will cut through thickness (dimension perpendicular to the longitudinal surface of interest) of the sample.

Position the test sample on the compound miter saw such that the longitudinal surface being evaluated for cutability is facing up and such that the blade will cut through the portion of the longitudinal surface of interest for evaluation and cut perpendicular to the orientation direction of the OPC. Clamp the sample into place. The sample should have a thickness such that the blade will cut all the way through the sample thickness.

Start the saw and, when the blade is running full speed, cut into the sample in a manner such that the teeth of the blade enter the bottom of the sample and exit the top of the sample (the longitudinal surface facing up). Cut a notch all the way through the thickness (dimension perpendicular to surface being evaluated) of the sample and 75-90% of the way through the width (the dimension mutually perpendicular to the thickness and the drawing direction) of the sample. The notch is perpendicular to the drawing direction and through the thickness of the sample. Back the blade through the notch and turn off the saw. Move the sample over and make a total of four parallel cuts through the sample in like manner.

Performance Rating
Evaluate and assign a cut rating to each of the four cuts in a sample and then average the four cut ratings (rounding to the nearest integer) to obtain an average performance rating value of the cutability of the sample.

Evaluate the cuts according to three criteria: (1) Number of fibrils per inch of cut length (count fibrils in 2.54 centimeter lengths over the length of the cut and use the highest 2.54 centimeter length count); (2) Average length of fibrils (determine the average fibril length for 2.54 centimeter lengths over the length of the cut and use the highest average 2.54 average length count); and (3) the average length of fibril tear out (determine the average length of fibril tear out for 2.54 centimeter lengths over the length of the cut and use the highest average 2.54 average length of fibril tear out). A "fibril" is a fiber of polymer composite that extends in the orientation direction of an OPC and, typically, extends into the cut region of the OPC. The "tear out" is the extent a fibril tears away from an OPC surface proximate to a cut. Hence, the length of a fibril includes the length of fibril extending into a cut plus the length of fibril torn off from (delaminated from) an OPC surface proximate to the cut. Examine the surface that was facing up during the cut procedure. Assign a numerical cut rating most closely to the standard set forth in Table 1 for each cut. FIG. 1 provides visual standards for many of the cut ratings.

TABLE 1

| Cut Rating | Fibrils Per Inch | Fibril Length (millimeters) | Fibril Tear-Out (millimeters) |
| --- | --- | --- | --- |
| 10 | 0 | 0 | 0 |
| 9 | 3 or less | less than 1 | 0 |
| 8 | 5 or less | less than 2 | less than 1 |
| 7 | 8 or less | 3 | 1-2 |
| 6 | 10 or less | 3 | greater than 2 |
| 5 | 20 or less | 3 | 2-3 |
| 4 | 30 or less | 3 | 3 or greater |
| 3 | essentially continuous | 3 | 3 or greater |

Orientation Ratio Measurement Method

Equipment:
Use a micro-Raman system using a Kaiser Raman Spectrograph (Raman RXN Systems) coupled to a Mark II probe head (Kaiser Optical Systems, Inc.) and Leica microscope (DMLP). Fit the Mark II probe head with a polarizing attachment, which is available from Kaiser Optical Systems, Inc. with the probe head. The polarizing attachment includes a set of two plates in the excitation beam path and a set of two plates in the light collection path. The spectrograph includes an Invictus laser for excitation at 785 nanometers. Automated data collection can be done with any appropriate software, such as Hologram software. Data process can be carried out in either GRAMS/AI (Thermo Scientific) or OMNIC (Thermo Scientific).

General Method for Determining Orientation Ratio
Determine orientation ratio using a polarized micro-Raman spectroscopy. Use linearly polarized light and collect light polarized in the same linear direction as light incident onto a sample. Collect light oriented parallel to the orientation direction of a sample (parallel polarization) and also collect light polarized perpendicular to the orientation direction of the sample (perpendicularly polarization).

The incident beam has a diameter of approximately 15 microns. Select a beam power that is low enough not to affect orientation of the sample being analyzed. If the incident beam is too powerful it can heat the polymer sample and instigate relaxation in the sample. Heating can be a particular problem in dark or highly pigmented samples. Test various incident beam powers on an oriented sample and reduce power until incident beam induced relaxation is no longer observed over a five minute exposure and then cut that power in half to collect spectra. In general, the incident beam power is in a range of 30-100 milliwatts.

In general, the procedure requires identifying and monitoring bands in the Raman spectrum of a material of interest: one whose intensity is insensitive to polymer orientation (a reference band) and one whose intensity is sensitive to polymer orientation (an orientation band). The band can be a crystalline or amorphous band, but is desirably a crystalline band where possible. The reference band should show little, preferably no change in spectral intensity when analyzing with parallel and perpendicularly polarized light. "Parallel" and "perpendicular" are relative to the orientation axis of a sample OPC. The orientation band, in contrast, should produce a strong spectral peak intensity with parallel polarized light and a weak spectral peak intensity with perpendicular polarized light. One way to select a reference band and an orientation band is to collect a polarized Raman spectrum from an oriented fiber, film or small scale sample of the composition of interest and select band that display spectral intensity behavior as described above for the reference and orientation bands.

Table 2 provides desirable orientation and reference bands for some popular orientable polymers. Those skilled in the art understand that the actual peak frequencies of the bands can be +/− several wavenumbers from those in Table 2 depending on the environment of the polymer.

TABLE 2

| Polymer | Orientation Band ($cm^{-1}$) | Reference Band ($cm^{-1}$) |
|---|---|---|
| Polypropylene | 809 | 841 |
| Polyethylene | 1415 | C—H stretch integrated over 2800-3000 $cm^{-1}$ |
| Polyvinyl Chloride | 1515 | approximately 600 |
| Polyethylene Terephthalate | 1612 | aromatic C—H stretch at approximately 3100 $cm^{-1}$ |
| Polybutylene Terephthalate | 1614 | aromatic C—H stretch at approximately 3100 $cm^{-1}$ |

When analyzing a sample, collect and average enough spectra at a given location in the sample to produce a signal to noise ratio of at least 100 to 1. Determine the orientation ratio for that location in the sample using the following equation:

$$OR = \frac{I_{orientation,//} / I_{reference,//}}{I_{orientation,\perp} / I_{reference,\perp}} \quad \text{Equation 1}$$

where:
OR is the orientation ratio;
$I_{orientation,//}$ is the intensity of the spectral signal at the orientation band with parallel polarized light;
$I_{reference,//}$ is the intensity of the spectral signal at the reference band with parallel polarized light;
$I_{orientation,\perp}$ is the intensity of the spectral signal at the orientation band with perpendicular polarized light; and
$I_{reference,\perp}$ is the intensity of the spectral signal at the reference band with perpendicular polarized light.

OPC Sample Preparation:

It is important in preparing a sample for OR measurement to avoid modifying the polymer orientation in any way by, for example, heating any portion of the sample to near its softening temperature.

To analyze for a de-oriented surface layer, cut a portion of a sample to expose an interior face. Polish the interior face using a wet grinding material to obtain a flat surface for analysis.

Orientation Ratio Analysis

Analyze the OPC sample by determining OR values as a function of depth into the OPC. Depth is a dimension extending perpendicularly from a longitudinal surface along the polished face.

At each depth, average the OR values of four different spots on a line parallel to the longitudinal surface to obtain an OR value for polymers at that depth. Then go to a depth approximately 20 microns deeper (more remote from the longitudinal surface) into the sample and measure OR values at four different spots on a line parallel to the longitudinal surface and take their average to obtain an OR value for polymers at that depth. Repeat this procedure until reaching a depth where either OR values at five different depths change by 10% or less or until reaching a depth half-way through the sample. Take care to collect OR data by directing the laser beam on polymer and avoid filler particles and voids or cavities. Filler particles, voids and cavities can influence Raman peak intensity and artificially influence interpretation of orientation.

Figure 2:
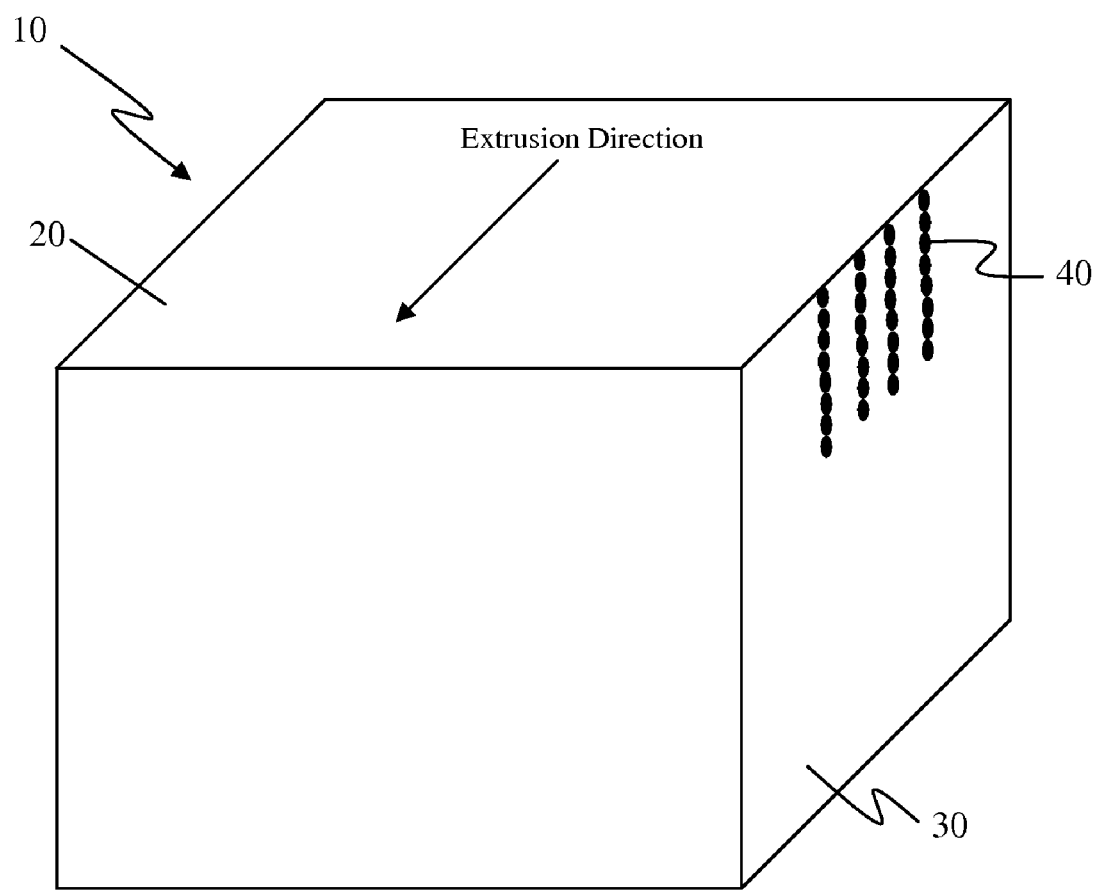
FIG. 2 illustrates how to conduct a de-oriented surface layer thickness analysis on a cavitated OPC.

FIG. 2 illustrates sample cavitated OPC 10 having an extrusion direction (which coincides with the orientation axis of the OPC) as shown. OPC 10 has longitudinal surface 20 and interior surface 30. Spots 40 illustrate (generally, but not to scale) a possible Raman analysis pattern for determining the depth of a de-oriented surface layer containing longitudinal surface 20.

OPCs of the present invention have a de-oriented surface layer containing a longitudinal surface that desirably has OR values that are less than 2, preferably 1.5 or less, more preferably 1.25 or less, still more preferably of one. Adjacent to the relaxed longitudinal surface layer and more proximate to the center of the OPC is a highly oriented internal polymer composition extending to a depth of 100 microns beyond the de-oriented surface layer desirably having an average OR value greater than 2, more preferably 2.5 or more, still more preferably 3 or more.

It is desirable to use a plot of OR values as a function of depth into the OPC in order to determine the de-oriented longitudinal surface layer thickness.

EXAMPLES

Comparative Example A

Comparative Example (Comp Ex) A is a commercially available color coordinated privacy fence slat available form Green Forest Engineered Products, LLC. Comparative Example A is a polypropylene OPC containing 30-40 wt % wood flour filler and having a density of 0.5-0.65 grams per cubic centimeter (g/cc). Comp Ex A is believed to have a cavitated void volume in a range of 35-52 vol % based on total OPC volume.

Figure 3:
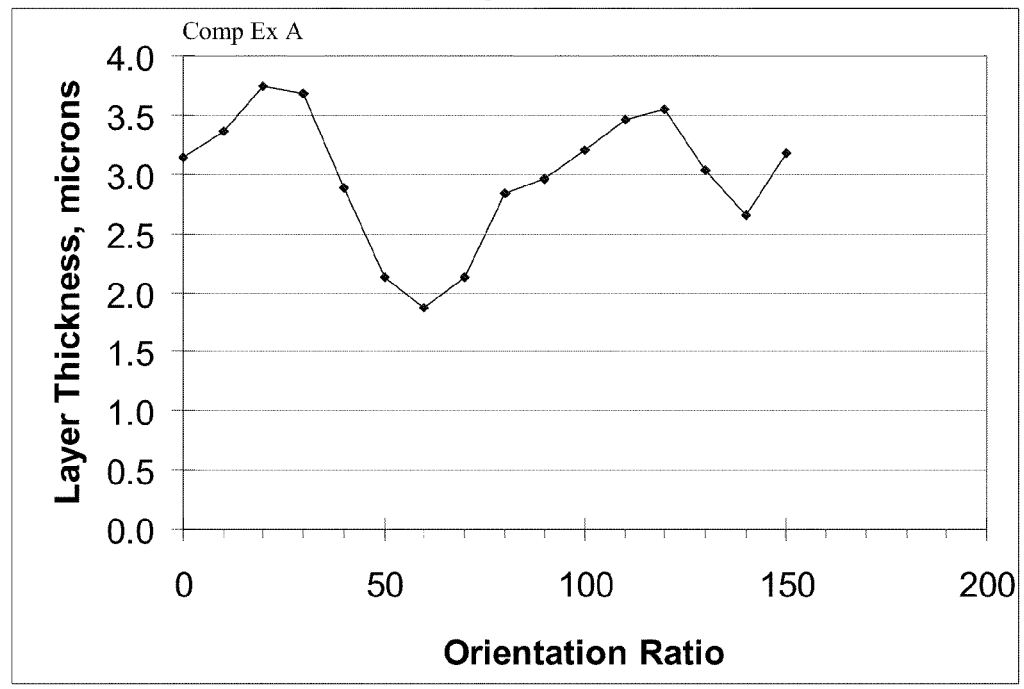
FIG. 3 is a plot of orientation ratio (OR) as a function of depth from a longitudinal surface of Comparative Example A.

Characterize Comp Ex A using the Cutability Test Method and Orientation Ratio Measurement Method. Comparative Example A has a cutability rating of 4 and a non-detectable de-oriented surface layer thickness (<10 microns). FIG. 3 is a plot of OR values as a function of depth into Comp Ex A from a longitudinal surface.

Comp Ex B

Control

Prepare an orientable polymer composition by feeding components together in a specific weight ratio either as individual components or in any combination of pre-compounded compositions to an extruder. The extruder is a Maplan TC-92 counter-rotating intermeshing parallel twin screw extruder (92 millimeter screw diameter). The orientable polymer composition contains 49 wt % polypropylene polymer (Nucleated polypropylene-ethylene random copolymer having 0.5 wt % ethylene component and a melt flow rate of 3 (for example, INSPIRE™ D404 Performance Polymer, INSPIRE is a trademark of The Dow Chemical Company) ), 46 wt % Talc (50-60 wt % talc and 40-50 wt % magnesium carbonates having a median diameter of 16.4 microns. (for example, TC-100 from Luzenac), 3 wt % pigment package (Redwood mixed metal oxide pigment package available from Clariant Corporation), 2 wt % lubricant (TR251 available from Struktol Company of America), with wt % based on total orientable polymer composition weight. The orientable polymer composition has a softening temperature of approximately 163° C.

The extruder heats and mixes the orientable polymer composition and extrudes the orientable polymer composition into a billet having dimensions of five centimeters (two inches) thick by 20 centimeters (eight inches) wide. The billet continuously proceeds through a calibrator that cools the billet and stabilizes the dimensions of the billet. The billet then continuously proceeds through a water cooler and ovens to thermally condition the billet to a drawing temperature approximately 20° C. below the softening temperature of the orientable polymer composition. The billet then continuously proceeds through a drawing die.

Continuously feed the orientable polymer composition through a converging solid state drawing die using haul-off(s) (for example, caterpillar pullers) to produce an OPC. Draw the orientable polymer composition through the converging die at a draw rate of 8-10 feet per minute. The solid state drawing die is a substantially proportional drawing die (as described in published United States patent application 20080111277, incorporated in its entirety herein by reference) that directs drawing of a polymer composition in such a manner so as to achieve an OPC having a cross sectional shape proportional to that of the orientable polymer composition entering the die. Use a die having a shaping channel that continuously converges so as to produce an OPC having final dimensions of 8.9 centimeters by 2.3 centimeters and a density of approximately 0.85 (+/−0.02) grams per cubic centimeter when using a drawing rate of 3 meters (10 feet) per minute. Cut the resulting OPC to any desired length.

Figure 4:
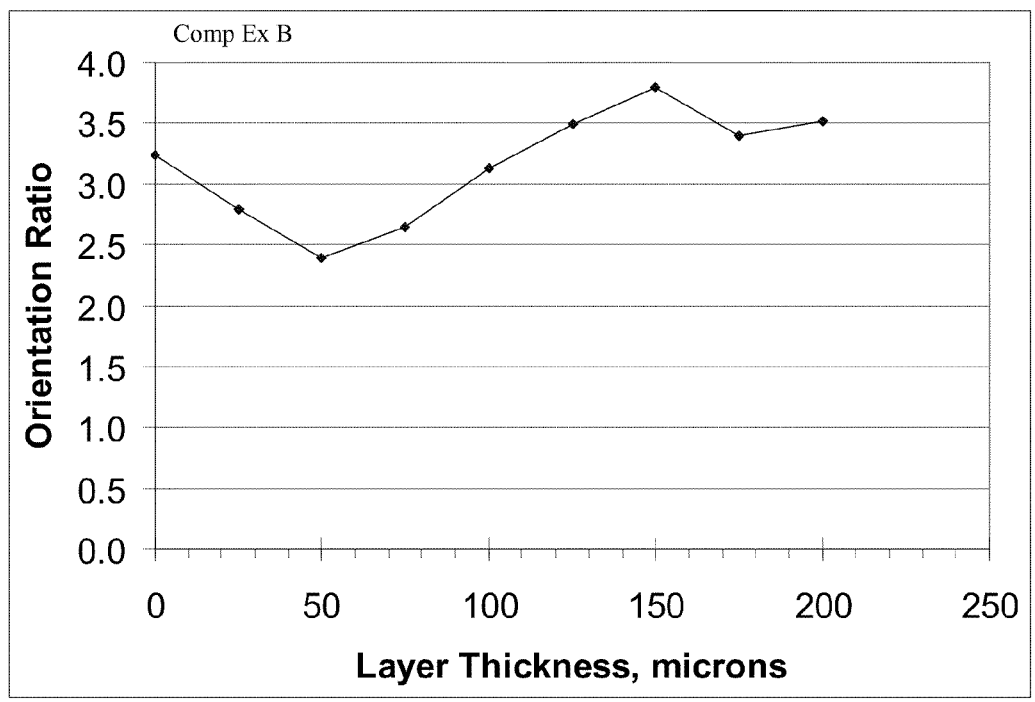
FIG. 4 is a plot of OR as a function of depth from a longitudinal surface for Comparative Example B.

The resulting OPC is Comp Ex B. Comp Ex B has a cavitated void volume of approximately 35 vol %. Characterize Comp Ex B using the Cutability Test Method and Orientation Ratio Measurement Method. Comp Ex B has a cutability rating of 3 and a non-detectable de-oriented surface layer thickness (<10 microns). FIG. 4 is a plot of OR values as a function of depth into Comp Ex B from a longitudinal surface.

Comp Ex C

Embossed Control

Emboss a 2.4 meter (eight foot) long OPC that is equivalent to Comp Ex B using a four-sided roll-type embossing unit with electrically heated rollers where the side and bottom rollers are smooth rollers and the top roller is a 12-inch diameter by 14-inch face length wood grain embossing pattern. Heat all rollers to 177° C. Feed the OPC through the embossing unit at a rate of 4.6 meters (15 feet) per minute and a closure pressure of 983 Newtons per centimeter of OPC width.

To maximize likelihood of forming a de-oriented longitudinal surface layer, run the OPC through the embossing unit ten times, each with the wood grain-embossed surface facing the wood-grain embossing roller. The resulting OPC is Comp Ex C.

Figure 5:
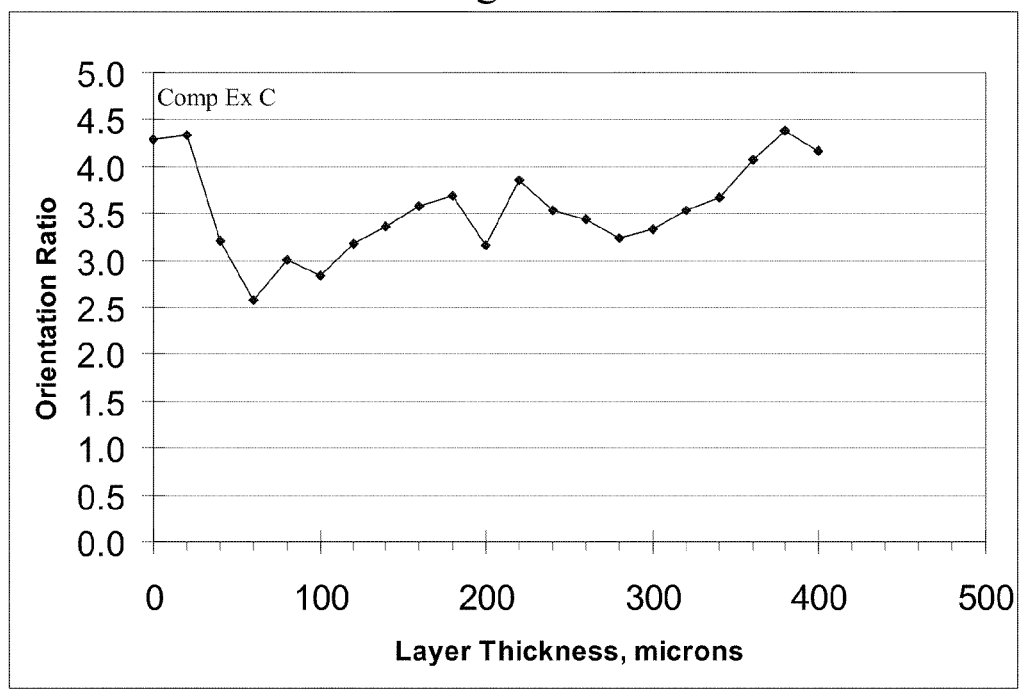
FIG. 5 is a plot of OR as a function of depth from a longitudinal surface for Comparative Example C.
Figure 6:
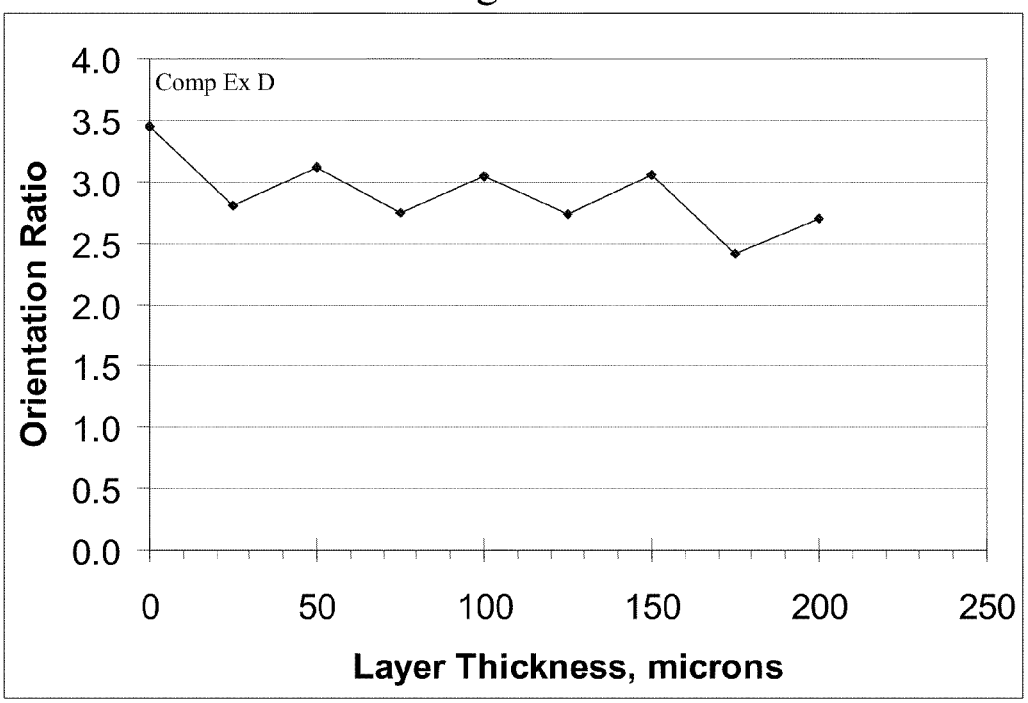
FIG. 6 is a plot of OR as a function of depth from a longitudinal surface for Comparative Example D.
Figure 7:
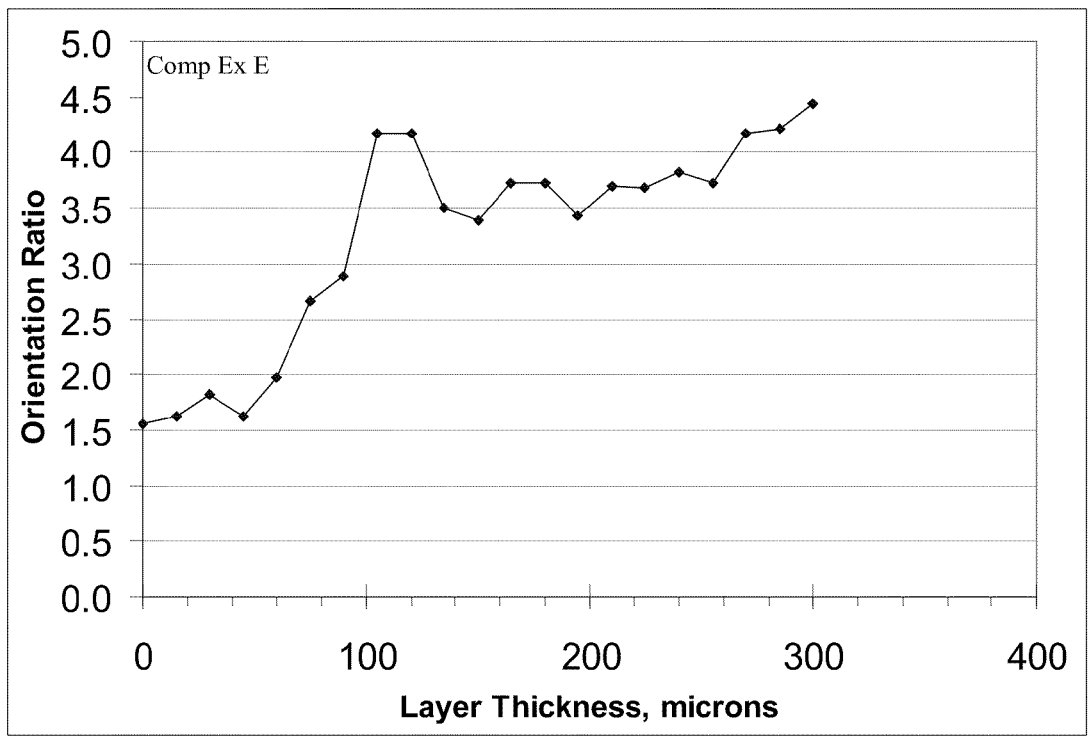
FIG. 7 is a plot of OR as a function of depth from a longitudinal surface for Comparative Example E.
Figure 8:
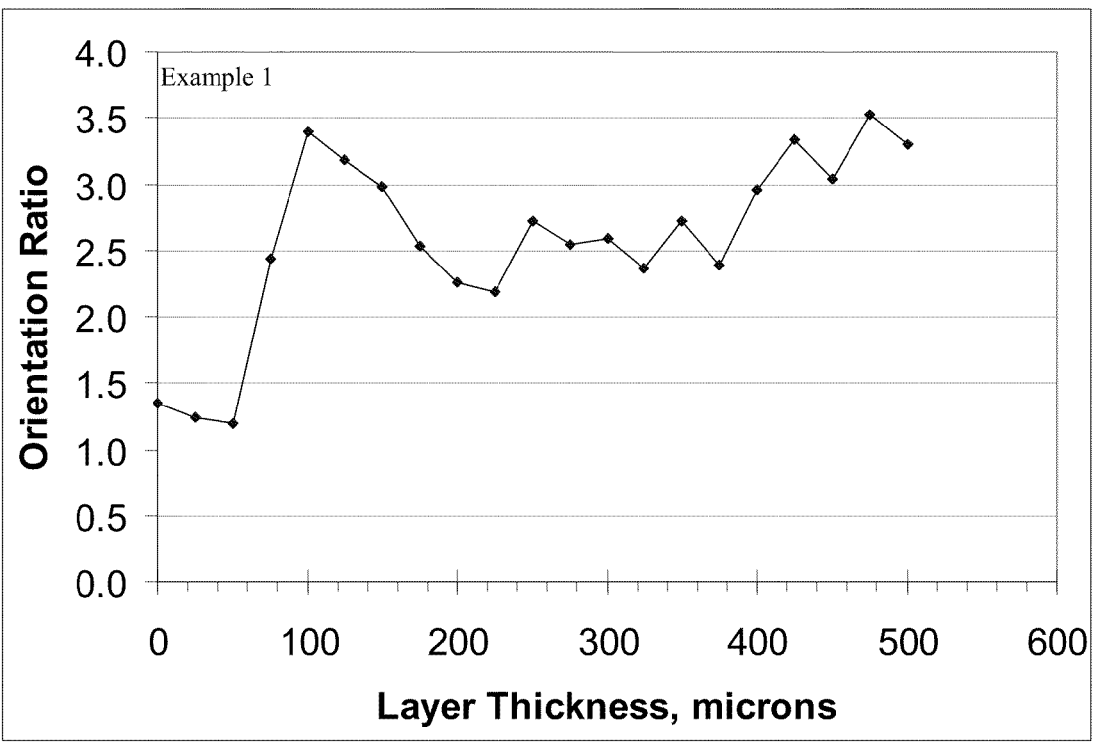
FIG. 8 is a plot of OR as a function of depth from a longitudinal surface for Example 1.
Figure 9:
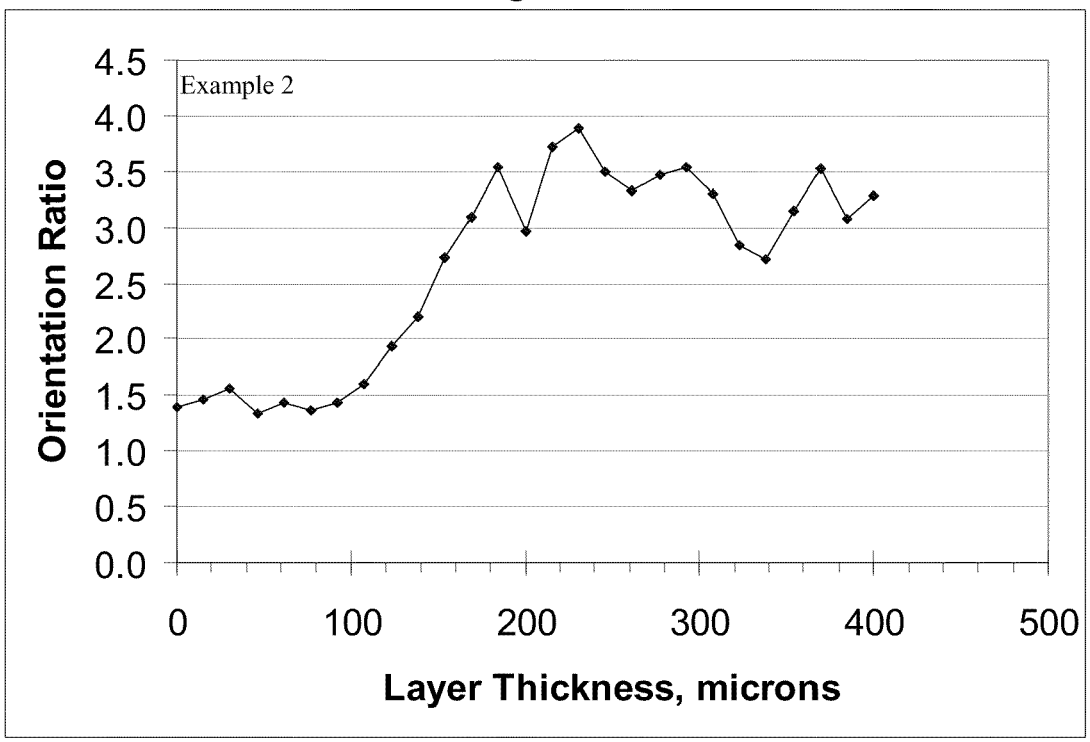
FIG. 9 is a plot of OR as a function of depth from a longitudinal surface for Example 2.
Figure 10:
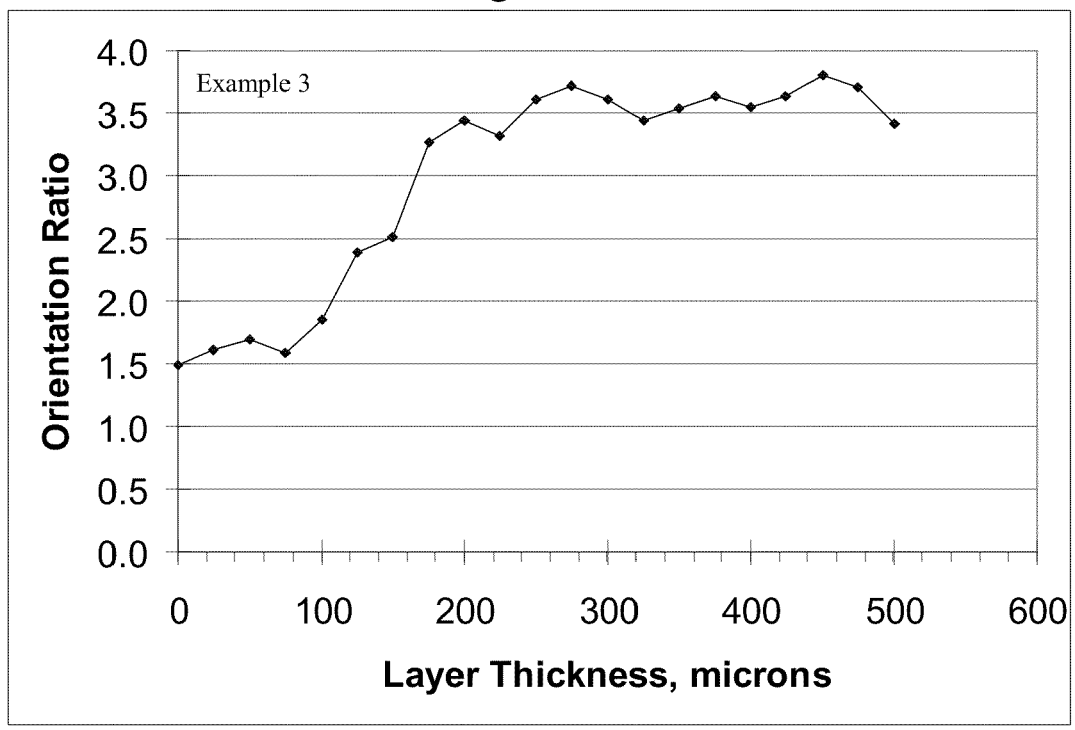
FIG. 10 is a plot of OR as a function of depth from a longitudinal surface for Example 3.
Figure 11:
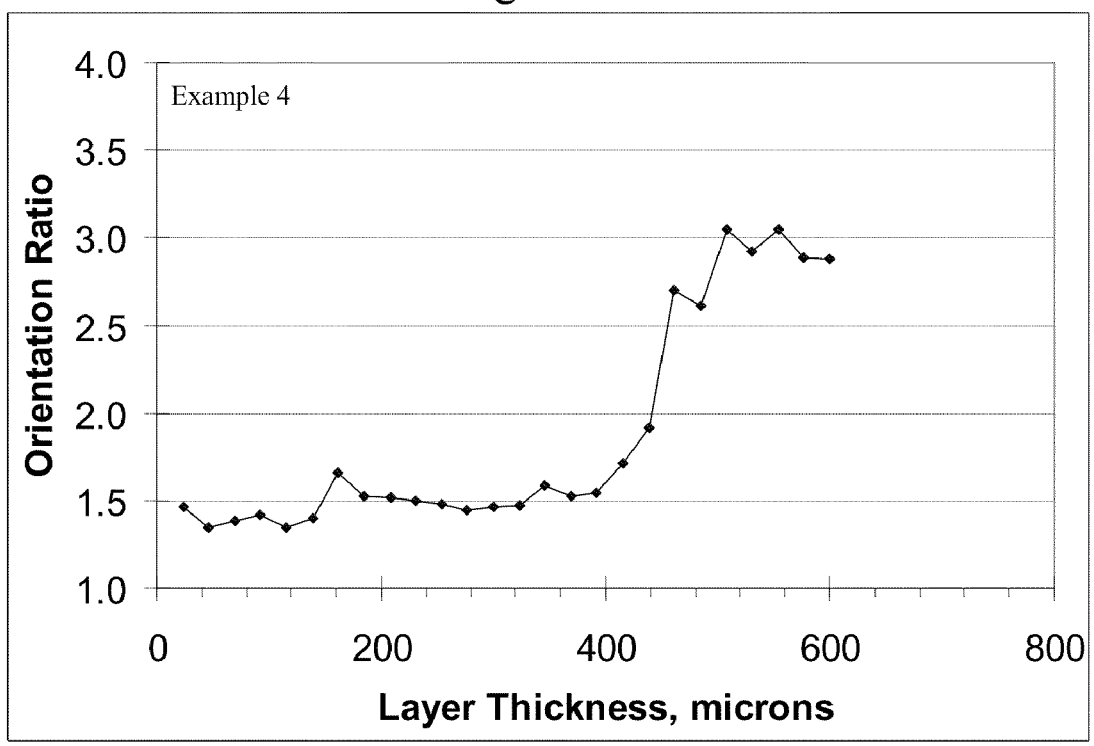
FIG. 11 is a plot of OR as a function of depth from a longitudinal surface for Example 4.

Characterize Comp Ex C using the Cutability Test Method and Orientation Ratio Measurement Method. Evaluate the cutability of the smooth embossed surface of Comp Ex C opposing the grain-embossed surface. Comp Ex C has a cutability rating of 3 and a non-detectable de-oriented surface layer thickness (<10 microns). FIG. 5 is a plot of OR values as a function of depth into Comp Ex C from a longitudinal surface.

Comp Ex C illustrates the inability for an embossing method alone to create an OPC of the present invention.

Comp Exs D and E and Examples 1-4

Heat Treated OPC

Expose all longitudinal surfaces of an OPC equivalent to Comp Ex B to a column of hot air (950° C. +/−50° C.) at a sufficient velocity to displace the boundary layer air around the OPC to heat the longitudinal surfaces of the OPC. The column of heated air is sufficient to extend the width and thickness of the OPC and covers approximately 15 centimeters (6 inches) along the length of the OPC at any one time. Direct the OPC lengthwise through this column of heated air at different rates (see Table 3 for appropriate rates).

Characterize the resulting heat-treated OPCs using the Cutability Test Method and Orientation Ratio Measurement Method. Cutability rating values and de-oriented longitudinal surface layers are in Table 3. FIGS. 6-11 are plots of OR values as a function of depth into the heat treated OPCs from a longitudinal surface for Comp Ex D, Comp Ex E, and Example 1-4, respectively.

TABLE 3

| Sample | Heat Treatment Feed Rate (meters per minute (feet per minute)) | De-Oriented Surface Layer Thickness (microns) | Cutability Rating | Density (g/cc) | Cavitation Void Volume (vol %) |
| --- | --- | --- | --- | --- | --- |
| Comp Ex D | 6.1 (20) | <10 | 4 | 0.87 | 34 |
| Comp Ex E | 4.6 (15) | 60 | 4 | 0.82 | 38 |
| Example 1 | 3.7 (12) | 80 | 7 | 0.87 | 34 |
| Example 2 | 3 (10) | 130 | 8 | 0.86 | 35 |
| Example 3 | 2.4 (8) | 110 | 7 | 0.86 | 35 |
| Example 4 | 1.5 (5) | 450 | 9 | 0.86 | 34 |

Examples 1-4 are free of foaming agents and foaming agent residuals. Examples 1-4 have cavitated voids throughout their entire cross section.

Figure 12:
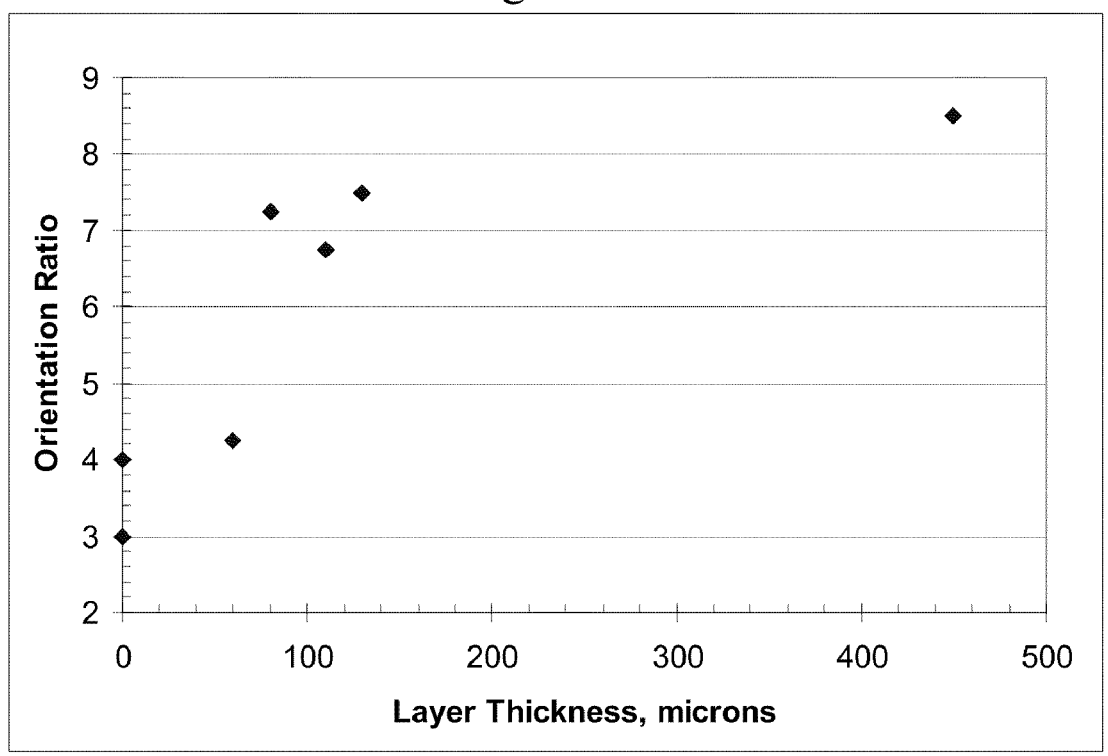
FIG. 12 is a plot of cutability rating as a function of depth from a longitudinal surface for Comp Exs B, D and E and Exs 1-4.

FIG. 12 is a plot of cutability rating versus de-oriented surface layer thickness for Comp Exs B, D and E and Examples 1-4. This plot illustrates a surprising criticality about obtaining a de-oriented surface layer thickness of approximately 80 microns: cutability rating dramatically increases when a de-oriented surface layer thickness reaches approximately 80 microns and only minimally increases when the de-oriented surface layer thickness exceeds 80-120 microns.

Figure 13:
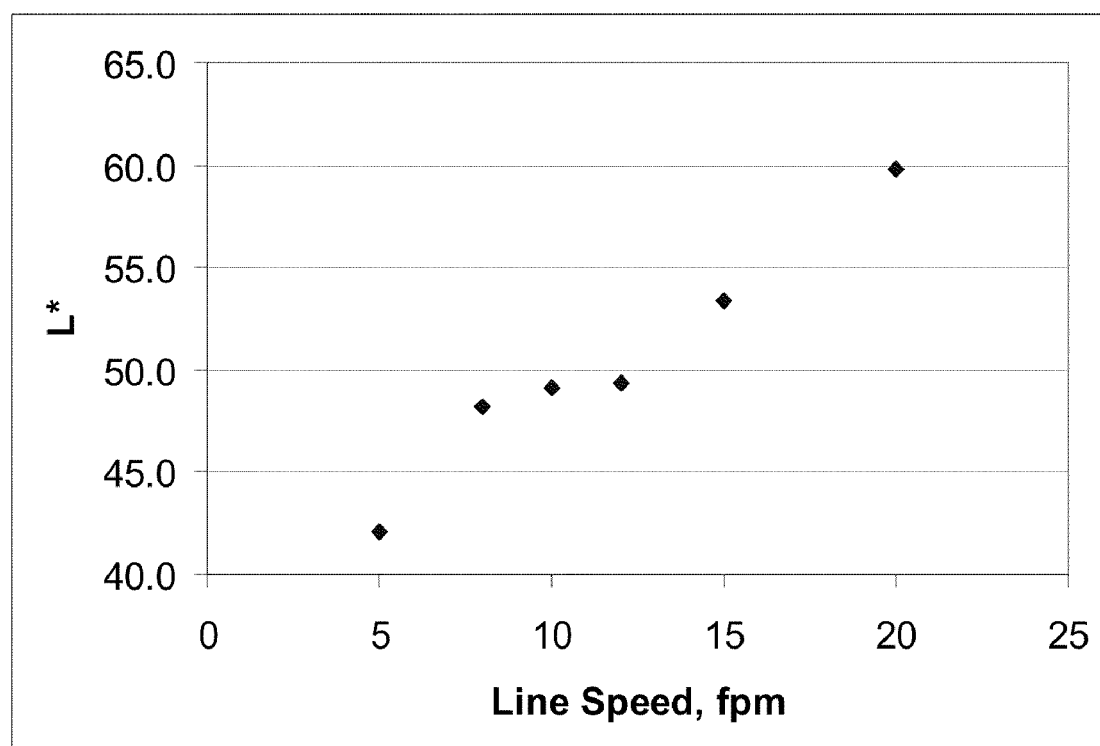
FIG. 13 is a plot of lightness value (L*) versus line speed through the heating step that creates the de-oriented longitudinal surface layer for Comparative Examples D and E and Examples 1-4.

FIG. 13 is a plot showing the L* value for Comp Exs D and E and Examples 1-4 as a function of line speed through the heating step (in feet per minute (fpm)). L* is a measure of lightness in a CIE color system (either CIELab or CIELCH system). An L* of zero is black while an L* value of 100 is pure white. Measure L* on a heat treated longitudinal surface of the subject materials, the same surface analyzed for cutability, using a portable sphere spectrophotometer (SP62 model Sphere Spectrophotometer available from X-Rite, Inc.) and X-Rite Color Master software (version 2 available from X-Rite, Inc.). Calibrate the instrument using X-Rite Black and White color standards. Use a 14 millimeter aperture and Active Illuminate/Observer values of D65/10 degrees. SPIN k1=0.04; SPIN k2=0.60; SPEX k1=0.00; SPEX k2=0.60. IllObs1=D65/10 and IllObs2=F2/10.

FIG. 13 illustrates that heating the cavitated OPC longer (a slower line speed corresponds to longer heating since the cavitated OPC will reside in the hot air for a longer period of time) results in a darker colored sample (lower L* value). For reference, Comparative Example B, which does not experience any heating, has an L* value of 64.

What is claimed is:

1. An oriented polymer composition comprising a continuous orientable polymer phase wherein the oriented polymer composition:
   (a) is cavitated,
   (b) is of sufficient size that each cross sectional dimension of the
   oriented polymer composition is at least three millimeters; and
   (c) has a thickness, at least one surface and at least one de-oriented surface layer that contains the surface, the de-oriented surface layer having a thickness of at least 80 microns and at least 50 microns less than half of the thickness of the oriented polymer composition, the de-oriented surface layer characterized by having a lower degree of polymer orientation than a 100 micron thick portion of the oriented polymer composition adjacent to the de-oriented layer and more proximate to the center of the oriented polymer composition.

2. The oriented polymer composition of claim 1, further comprising at least one filler material.

3. The oriented polymer composition of claim 1, further comprising at least one type of inorganic filler.

4. The oriented polymer composition of claim 1, further comprising at least one pigment.

5. The oriented polymer composition of claim 1, wherein the oriented polymer composition has a density of 0.9 grams per cubic centimeter or less.

6. The oriented polymer composition of claim 1, wherein at least one surface that is part of a de-oriented surface layer is further characterized by having an embossed pattern.

7. The oriented polymer composition of claim 1, wherein polymers in the de-oriented surface layer have an orientation ratio value of 2 or less while the oriented polymer composition below the de-oriented surface layer and extending to a depth of 100 microns below the de-oriented surface layer has an average orientation ratio value of greater than 2 with orientation ratio determined according to Orientation Ratio Measurement Method.

8. The oriented polymer composition of claim 1, wherein the oriented polymer composition has a flexural modulus of 1.4 gigapascals or greater according to ASTM method D6109.

9. The oriented polymer composition of claim 8, wherein the oriented polymer composition has a density of 0.9 grams per cubic centimeter or less.

10. The oriented polymer composition of claim 1, wherein the continuous orientable polymer phase comprises at least one polymer selected from a group consisting of polypropylene, polyethylene, polyester and polyvinylchloride.

* * * * *